(12) United States Patent
Bishop

(10) Patent No.: US 10,259,184 B2
(45) Date of Patent: Apr. 16, 2019

(54) ALUMINUM DUST COLLECTION AND COMPACTING APPARATUS

(71) Applicant: Ford Motor Company, Dearborn, MI (US)

(72) Inventor: Frank Bishop, Wales, MI (US)

(73) Assignee: Ford Motor Company, Dearborn, MI (US)

( * ) Notice: Subject to any disclaimer, the term of this patent is extended or adjusted under 35 U.S.C. 154(b) by 2 days.

(21) Appl. No.: 15/477,480

(22) Filed: Apr. 3, 2017

(65) Prior Publication Data

US 2018/0281136 A1 Oct. 4, 2018

(51) Int. Cl.
*B23Q 11/00* (2006.01)
*B30B 9/32* (2006.01)
(Continued)

(52) U.S. Cl.
CPC .............. *B30B 9/327* (2013.01); *B03B 9/061* (2013.01); *B04C 11/00* (2013.01); *B07B 9/00* (2013.01); *B23K 26/0093* (2013.01); *B23K 26/142* (2015.10); *B23K 26/16* (2013.01); *B23Q 11/005* (2013.01); *B23Q 11/0046* (2013.01); *B23Q 11/0057* (2013.01); *B24B 55/06* (2013.01); *B30B 11/00* (2013.01); *B65G 53/24* (2013.01); *B65G 53/60* (2013.01); *C22B 1/2406* (2013.01); *C22B 1/248* (2013.01); *B65G 53/10* (2013.01); *B65G 53/46* (2013.01); *B65G 53/4691* (2013.01); *Y10S 29/031* (2013.01); *Y10S 29/094* (2013.01); *Y10S 82/901* (2013.01); *Y10S 100/903* (2013.01); *Y10T 29/49753* (2015.01);
(Continued)

(58) Field of Classification Search
CPC .............. Y10T 29/49753; B30B 9/327; B30B 9/30–9/3096; B30B 9/32; C22B 1/248; C22B 1/2406; C22B 1/24
USPC .................. 29/403.2; 100/903–909; 406/173
See application file for complete search history.

(56) References Cited

U.S. PATENT DOCUMENTS 2,302,980 A * 11/1942 Stern .................... C22B 21/0007
29/403.2
6,206,247 B1 * 3/2001 Ingram .............. B65G 53/4633
222/368
(Continued)

FOREIGN PATENT DOCUMENTS

DE           19921485 A  * 11/2000
DE    102007056330 A1  *  5/2009
(Continued)

OTHER PUBLICATIONS

Machine Translation of JP 11-226839-A, which JP '839 was published Aug. 1999.*
(Continued)

*Primary Examiner* — Erica E Cadugan
(74) *Attorney, Agent, or Firm* — Burris Law, PLLC

(57) ABSTRACT

An apparatus for collecting dust from a cutting unit is provided. The apparatus includes a rotary valve operatively connected to the cutting unit, a conduit in fluid communication with the rotary valve, and a compacting machine disposed downstream from the conduit and configured to receive dust from the conduit. A blower is configured to pull air downstream to carry the dust into the compacting machine. The compacting machine produces a compact from the dust.

18 Claims, 4 Drawing Sheets

(51) Int. Cl.

| | |
|---|---|
| *B30B 11/00* | (2006.01) |
| *B65G 53/60* | (2006.01) |
| *B65G 53/46* | (2006.01) |
| *C22B 1/248* | (2006.01) |
| *B04C 11/00* | (2006.01) |
| *B07B 9/00* | (2006.01) |
| *B24B 55/06* | (2006.01) |
| *B23K 26/16* | (2006.01) |
| *B23K 26/00* | (2014.01) |
| *B23K 26/142* | (2014.01) |
| *B65G 53/24* | (2006.01) |
| *B03B 9/06* | (2006.01) |
| *C22B 1/24* | (2006.01) |
| *B65G 53/10* | (2006.01) |

(52) U.S. Cl.
CPC .... *Y10T 408/50* (2015.01); *Y10T 409/304088* (2015.01)

(56) References Cited

U.S. PATENT DOCUMENTS

| | | | | |
|---|---|---|---|---|
| 6,272,981 | B1 * | 8/2001 | Murata | B30B 9/3007 100/50 |
| 6,497,023 | B2 * | 12/2002 | Takano | B07B 15/00 100/102 |
| 8,281,714 | B2 * | 10/2012 | Yamaguchi | B01D 46/48 100/214 |
| 2001/0035510 | A1 * | 11/2001 | Oh | F16K 31/535 251/129.03 |
| 2012/0017553 | A1 * | 1/2012 | Park | A47L 9/1683 55/419 |

FOREIGN PATENT DOCUMENTS

| | | | | |
|---|---|---|---|---|
| EP | 490148 A2 | * | 6/1992 | |
| EP | 2455168 A1 | * | 5/2012 | |
| JP | 06-226583 A | * | 8/1994 | |
| JP | 10-000528 A | * | 1/1998 | |
| JP | 11-033868 A | * | 2/1999 | |
| JP | 11-226839 A | * | 8/1999 | |
| JP | 2002-103168 A | * | 4/2002 | |
| JP | 2003-260631 A | * | 9/2003 | |
| JP | 2005-231008 A | * | 9/2005 | |

OTHER PUBLICATIONS

Machine Translation of DE 19921485-A, which DE '485 was published Nov. 2000.*
Meyer Catalog 269-C-006 of Rotary Airlock Valves, pp. 1-27, uploaded to www.meyerindustrial.com in Nov. 2015.*
"NFPA Requirements for Using an Isolation Flap Valve on Your Dust Collection System" by David Grandaw, published in PBE in Oct. 2015, 3 pages.*

* cited by examiner

ALUMINUM DUST COLLECTION AND COMPACTING APPARATUS

FIELD

The present disclosure relates generally to a dust collection apparatus, and more particularly to a dust collection apparatus used with a machining apparatus for collecting metallic dust generated during operation of the machining apparatus.

BACKGROUND

The statements in this section merely provide background information related to the present disclosure and may not constitute prior art.

A machining apparatus for machining metallic materials, such as cutting, drilling, milling, grinding, blasting, and turning, can generate a significant amount of metallic dust. A dust collection apparatus is generally attached to the machining apparatus to collect the metallic dust in order to reduce air pollution at the worksite. The dust collection apparatus may include a container and one or more dust collection bins. The dust is guided and collected in the one or more dust collection bins through the container of the dust collection apparatus.

The dust collection bins are routinely transported and emptied to a larger drum container outside a manufacturing plant for disposal. When the dust collection bins are not emptied in time, the dust may build up in the container and become air-borne. Air-borne metallic dust can create a potential explosive hazard. More specifically, combustible materials can burn quite rapidly when in a smaller/fine form, such as dust. Materials that can oxidize, such as magnesium, can cause an explosion when in the form of smaller particles/dust. Other materials such as aluminum can form a suspension in air, which can then lead to an explosion.

When the metallic dust contained in the dust collection bins is exposed to air, a potential explosive hazard exists. Further, the routine handling and transporting of the dust collection bins from the worksite to the larger drum container outside the manufacturing plant creates a potential health and safety issue.

These dust-related issues, among other issues from manufacturing processes that create metallic dust, are addressed by the present disclosure.

SUMMARY

In one form, an apparatus for collecting dust from a cutting unit is provided. The apparatus includes a rotary valve operatively connected to the cutting unit, a conduit in fluid communication with the rotary valve, and a compacting machine disposed downstream from the conduit and configured to receive dust from the conduit. A blower is configured to pull air downstream to carry the dust into the compacting machine. The compacting machine produces a compact from the dust.

In other forms, the apparatus may further include a primary dust collection unit disposed downstream from the conduit and upstream from the compacting machine and a rotary air lock operatively connected to a downstream end portion of the dust collection unit. A blower is also be provided in one form of the present disclosure, which is operatively connected to the dust collection unit. Further, at least one slide gate may be operatively connected to the dust collection unit.

In still another form, a back-up dust collection unit may be disposed adjacent the primary dust collection unit and a rotary air lock operatively connected to a downstream end portion of the back-up dust collection unit. A blower may be operatively connected to the back-up dust collection unit, and at least one slide gate may be provided that is operatively connected to the back-up dust collection unit.

In still another form, an explosion isolation valve may also be provided and disposed along the conduit and upstream from the compacting machine. In one form, the compacting machine is a briquetter. A manual drum vacuum line may be operatively connected to the conduit upstream from the compacting machine.

In another form, an apparatus for collecting aluminum dust from a cutting unit is provided. The apparatus includes a rotary valve operatively connected to the cutting unit, a conduit in fluid communication with the rotary valve, a compacting machine, and an explosion isolation valve. The compacting machine is disposed downstream from the conduit and configured to receive aluminum dust from the conduit and to produce an aluminum compact. The explosion isolation valve is disposed along the conduit and upstream from the compacting machine.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
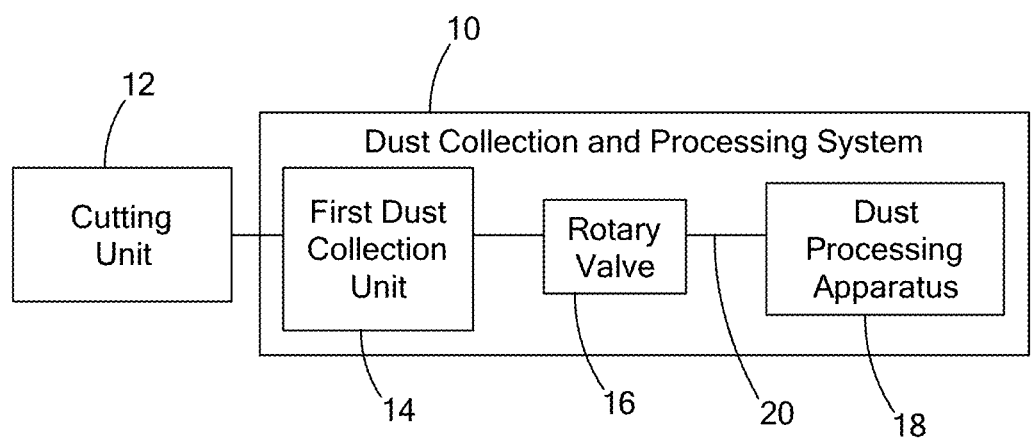
FIG. 1 is a schematic view of a dust collection and processing system used with a cutting unit and constructed in accordance with teachings of the present disclosure.

Referring to FIG. 1, a dust collection and processing system 10 constructed in accordance with the teachings of the present disclosure is used with a cutting unit 12 for collecting and processing metallic wastes, particularly metallic dusts, generated during operation of the cutting unit 12. The cutting unit 12 may be any processing, machining, or cutting unit such as a laser cutting system, a drilling unit, a milling unit, a grinding unit, a blasting unit, a turning unit, or any unit that generates metallic dust during operation. In one application, the cutting unit 12 is a laser cutting unit for cutting aluminum pipes formed by a hydro-forming process, and the metallic dust is aluminum dust.

The dust collection and processing system 10 generally includes a dust collection unit 14, a rotary valve 16, and a dust processing apparatus 18. The dust collection unit 14 is operatively connected to the cutting unit 12 to collect the metallic dust generated during operation of the cutting unit 12. The rotary valve 16 is disposed adjacent to and operatively connected to the dust collection unit 14 to continuously transport the dust collected by the dust collection unit 14 to the dust processing apparatus 18. A conduit 20 is provided between and is in fluid communication with the rotary valve 16 and the dust processing apparatus 18 for transporting dust collected by the dust collection unit 14 to the dust processing apparatus 18. While the dust collection unit 14 is shown to be a part of the dust collection and processing system 10, the dust collection unit 14 may be a separate unit from the dust collection and processing system 10. For example, the cutting unit 12 and the dust collection unit 14 may be disposed inside a manufacturing plant/building, whereas the dust processing apparatus 18 may be disposed in an enclosed structure located outside the manufacturing plant/building.

Figure 2:
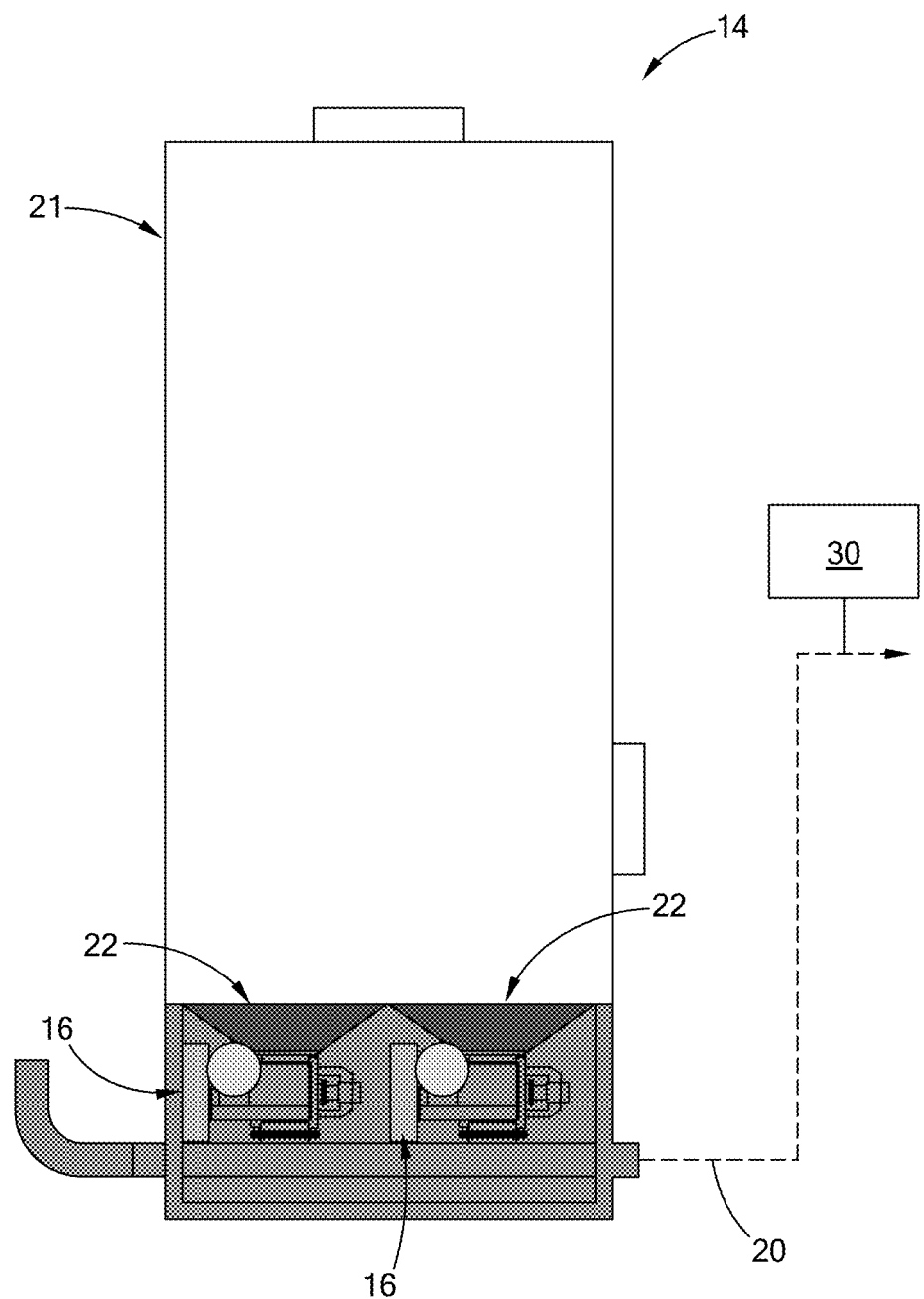
FIG. 2 is a schematic view of a dust collection unit and a rotary valve of the dust collection and processing system of FIG. 1.

Referring to FIG. 2, the dust collection unit 14 includes a housing 21 for receiving metallic dust, and one or more hoppers 22 disposed at a lower end of the housing 21. The rotary valves 16 are disposed at an end of the hoppers 22. The dust received inside the housing 21 is guided through the hoppers 22 and the rotary valves 16 to the conduit 20. High velocity air flow from a blower 30 is directed from the conduit 20 to pull the dust from the rotary valves 16 to the dust processing apparatus 18, which is described in greater detail below.

Figure 3:
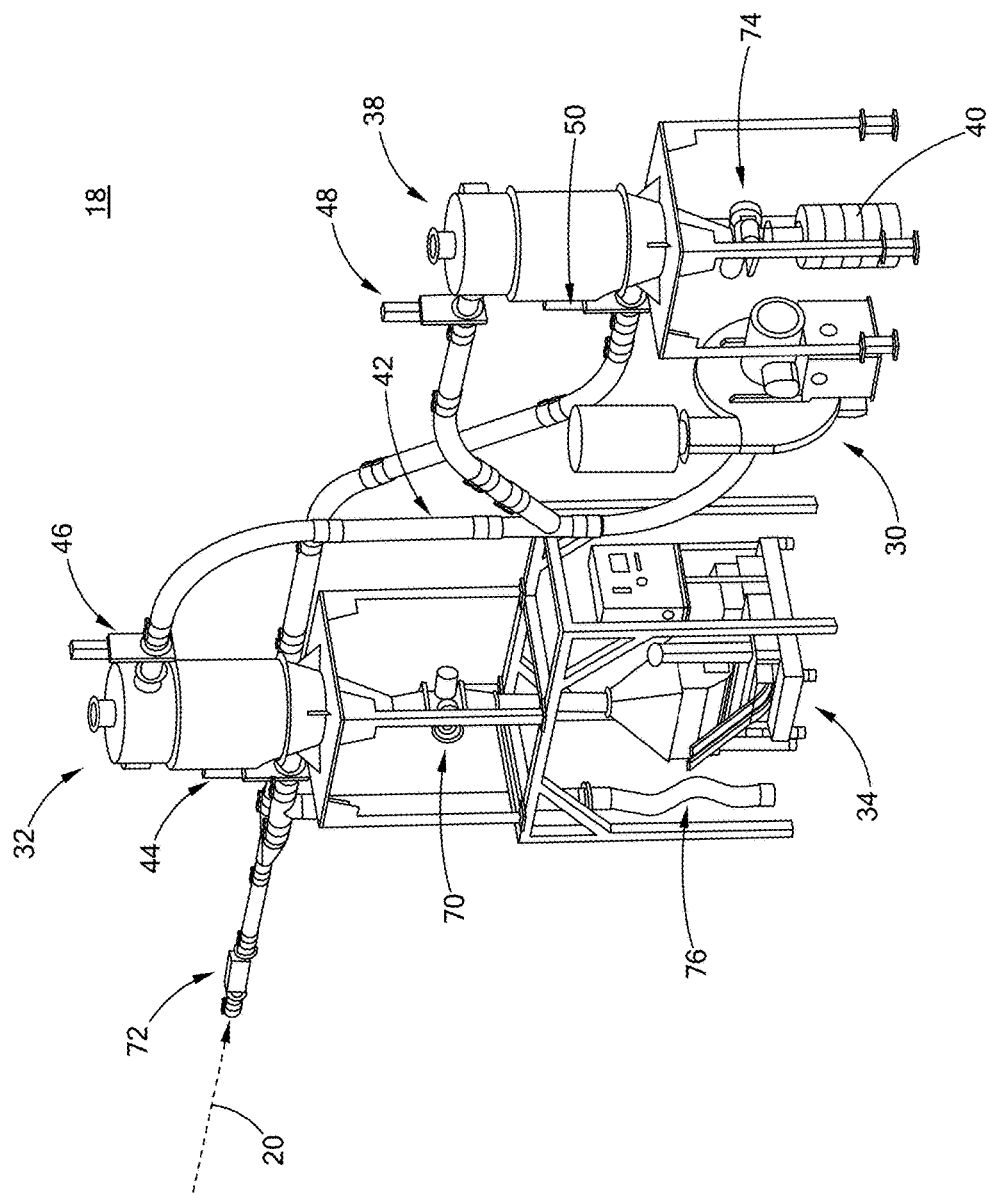
FIG. 3 is a schematic view of a dust processing apparatus of the dust collection and processing system of FIG. 1.

Referring to FIG. 3, the dust processing apparatus 18 is disposed downstream from the conduit 20 for processing and compacting the dust transported from the conduit 20. The dust processing apparatus 18 includes the blower 30, a primary dust collection unit 32, a compacting machine 34, and a backup dust collection unit 38.

The blower 30 is disposed downstream from both the primary dust collection unit 32 and the dust collection unit 14 to pull the dust from the dust collection unit 14 to the primary dust collection unit 32. In one form, the primary dust collection unit 32 may be a cyclone machine to separate dust from air and guide the dust to the compacting machine 34 disposed downstream from the primary dust collection unit 32. Similarly, the back-up dust collection unit 38 may also be a cyclone machine and further include a relatively large drum container 40, which can be removed for disposition of the dust collected therein. In another form, the compacting machine 34 may be operatively connected to the back-up dust collection unit 38 through the use of a manual drum vacuum line 76 as described in greater detail below.

The blower 30 is downstream from and is operatively connected to the primary dust collection unit 32 and the back-up dust collection unit 38 for selectively pulling or moving the dust either to the primary dust collection unit 32, or to the back-up collection unit 38. More specifically, a "Y" conduit 42 is connected between the blower 30, the primary dust collection unit 32, and the back-up dust collection unit 38 as shown. The blower 30 operates to selectively move the dust to either the primary dust collection unit 32 or the back-up dust collection unit 38 by way of slide gates 44, 46, 48, and 50, which are operated in one form by shop air, or external air pressure, and are controlled by a computer (not shown). In one form of the present disclosure, there are four (4) slide gates, one at an inlet and outlet of each of the primary dust collection unit 38 and the back-up dust collection unit 38.

Slide gates 44 and 46 are normally open when dust is being collected into the primary dust collection unit 32, while slide gates 48 and 50 are closed. When a bypass of dust from the primary dust collection unit 32 to the back-up collection unit 38 is desired, slide gates 44 and 46 close, and slide gates 48 and 50 open, thus providing for a flow of air and the collection of dust into the back-up collection unit 38.

Figure 4:
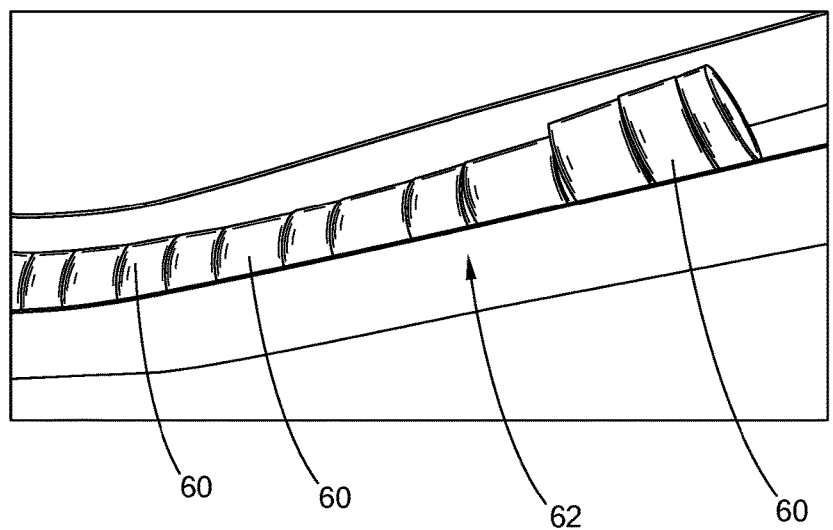
FIG. 4 is a schematic view of a plurality of dust compacts generated by a compacting machine of the dust collection and processing system of FIG. 1.

Referring now to FIG. 4, the compacting machine 34 may be a briquetter for compacting the collected dust into a plurality of compacts 60, such as aluminum compacts. The compacts 60 in one form may have a cylindrical shape, such as a puck, and weigh approximately 1 pound each. The compacting machine 34 may include a conveyor belt or channel 62 for continuously guiding and delivering the compacts 60 to an adjacent collection site or container (not shown). The compacts 60 can be relatively easily transported and handled for further processing or disposal, thereby reducing air pollution and mitigating health/safety concerns in handling and processing dust from the cutting unit 12.

Referring back to FIG. 3, the dust processing apparatus 18 further includes a number of additional components. For example, a first rotary air lock 70 is operatively connected to a downstream end portion of the primary dust collection unit 32, an explosion isolation valve 72 is disposed along the conduit 20 and upstream from the primary dust collection unit 32, a second rotary air lock 74 is operatively connected to a downstream end portion of the back-up dust collection unit 38, and a manual drum vacuum line 76 is connected to a downstream portion of the primary dust collection unit 32.

The first rotary air lock 70 is disposed between the primary dust collection unit 32 and the compacting machine 34 for controlling delivery of the dust out of the primary dust collection unit 32 to the compacting machine 34. Similarly, the second rotary air lock 74 controls delivery of the dust out of the back-up dust collection unit 38.

The explosion isolation valve 72 functions as a safety device and controls/isolates fluid communication, or the flow of dust, between the dust processing apparatus 18 and the dust collection unit 14. Should an explosion-caused fire occur inside the second collection unit 32 and/or the back-up dust collection unit 38, the fire and associated heat can be blocked by the explosion isolation valve 72. Therefore, the fire and associated heat will not be transferred back inside the building and to the dust collection unit 14. The explosion isolation valve 72 is also operable to block fire and associated heat in the opposite direction, namely, if there were to be an explosion-caused fire inside the dust collection unit 14. In this latter case, the explosion isolation valve 72 would inhibit fire and associated heat from traveling to the dust processing apparatus 18 from the dust collection unit 14.

As further shown, the manual drum vacuum line 76 is operatively connected to the conduit 20 at a location upstream from the primary dust collection unit 32. This manual drum vacuum line 76 is operatively connected to the back-up dust collection unit 38 and to the compacting machine 34 when the dust is diverted from the primary dust collection unit 32.

With the dust collection and processing system 10 of the present disclosure, the dust generated by the cutting unit 12 is collected in the dust collection unit 14 and continuously transported to the dust processing apparatus 18 for further processing into a plurality of dust compacts 60. The dust is less likely to be built up inside the housing 21 of the dust collection unit 14 to become air-borne, thereby reducing any explosive hazards.

Moreover, the dust collected in the dust collection unit 14 can be continuously transported to the primary dust collection unit 32 and/or the back-up collection unit 38, as opposed to smaller dust collection bins in the prior art dust collector. Since the primary dust collection unit 32 and the back-up dust collection unit 38 are enclosed structures and can be relatively easily handled and transported for further disposal, health and safety issues with handling dust can be mitigated.

It should be noted that the disclosure is not limited to the various forms described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. An apparatus for collecting dust from a cutting unit comprising:
   a rotary valve operatively connected to the cutting unit;
   a conduit in fluid communication with the rotary valve;
   a primary dust collection unit and a back-up dust collection unit that are disposed downstream from the conduit:
   a compacting machine disposed downstream from the primary dust collection unit and configured to receive dust from the conduit;
   a plurality of slide gates for operatively selectively controlling movement of the dust from the conduit to either one of the primary dust collection unit and the back-up dust collection unit; and
   a blower configured to pull air downstream to carry the dust into the compacting machine, and the compacting machine produces a compact from the dust.

2. The apparatus according to claim 1, wherein
   the primary dust collection unit is disposed downstream from the conduit and upstream from the compacting machine, the apparatus further comprising
   a first rotary air lock operatively connected to a downstream end portion of the primary dust collection unit.

3. The apparatus according to claim 2 wherein the primary dust collection unit is a cyclone.

4. The apparatus according to claim 3 wherein at least one of the slide gates is air operated and operatively connected to the primary dust collection unit.

5. The apparatus according to claim 1, wherein
   the back-up dust collection unit is disposed adjacent the primary dust collection unit, the apparatus further comprising
   a second rotary air lock operatively connected to a downstream end portion of the back-up dust collection unit.

6. The apparatus according to claim 1, further comprising a Y conduit connecting the blower to the primary dust collection unit and the back-up dust collection unit.

7. The apparatus according to claim 1, wherein at least one of the slide gates is air operated and operatively connected to the back-up dust collection unit.

8. The apparatus according to claim 1 further comprising an explosion isolation valve disposed along the conduit and upstream from the compacting machine.

9. The apparatus according to claim 1, wherein the compacting machine is a briquetter.

10. The apparatus according to claim 1 further comprising a manual drum vacuum line operatively connected to the conduit upstream from the compacting machine.

11. The apparatus according to claim 1, wherein the dust is an aluminum material.

12. An apparatus for collecting aluminum dust from a cutting unit comprising:
    a rotary valve operatively connected to the cutting unit;
    a conduit in fluid communication with the rotary valve;
    a primary aluminum dust collection unit and a back-up aluminum dust collection unit that are disposed downstream from the conduit:
    a compacting machine disposed downstream from the primary aluminum dust collection unit and configured to receive aluminum dust from the conduit and to produce an aluminum compact;
    a plurality of slide gates for operatively selectively controlling movement of the aluminum dust from the conduit to either one of the primary aluminum dust collection unit and the back-up aluminum dust collection unit; and
    an explosion isolation valve disposed along the conduit and upstream from the compacting machine.

13. The apparatus according to claim 12, wherein
    the primary aluminum dust collection unit is disposed downstream from the conduit and upstream from the compacting machine, the apparatus further comprising
    a first rotary air lock operatively connected to a downstream end portion of the primary aluminum dust collection unit.

14. The apparatus according to claim 13 further comprising a blower operatively connected to the primary and back-up aluminum dust collection units.

15. The apparatus according to claim 12, wherein at least one of the slide gates is air operated and operatively connected to the primary aluminum dust collection unit.

16. The apparatus according to claim 12, wherein
    the back-up aluminum dust collection unit is disposed adjacent the primary aluminum dust collection unit, the apparatus further comprising
    a second rotary air lock operatively connected to a downstream end portion of the back-up aluminum dust collection unit.

17. The apparatus according to claim 12 further comprising a manual drum vacuum line operatively connected to the conduit upstream from the compacting machine.

18. The apparatus according to claim 12, wherein the compacting machine is a briquetter.

* * * * *